United States
Nakagawa

[11] 3,850,509
[45] Nov. 26, 1974

[54] FISHEYE LENS SYSTEM
[75] Inventor: Jihei Nakagawa, Tokyo, Japan
[73] Assignee: Olympus Optical Co., Ltd., Tokyo, Japan
[22] Filed: Nov. 30, 1972
[21] Appl. No.: 310,968

[30] Foreign Application Priority Data
Dec. 7, 1971 Japan.............................. 46-98326

[52] U.S. Cl. ................................ 350/214, 350/196
[51] Int. Cl. ............................................. G02b 9/64
[58] Field of Search..................... 350/214, 196

[56] References Cited
UNITED STATES PATENTS
3,410,632  11/1968  Woltche............................. 350/214
3,622,227  11/1971  Shimizu ............................ 350/214
3,736,049  5/1973   Shimizu ............................ 350/214

Primary Examiner—John K. Corbin
Attorney, Agent, or Firm—Cushman, Darby & Cushman

[57] ABSTRACT

The present invention relates to photographic lens systems and more particularly, to a fisheye lens system which comprises seven lenses with a short overall length and a front lens of very small diameter and for which various aberrations are correcred favourably. The first lens is a negative meniscus lens, the second lens is a positive meniscus lens, the third lens is a negative meniscus lens, the fourth and fifth lenses are cemented positive lenses, the sixth lens is a positive meniscus lens and the seventh lens is a cemented positive lens. The lens system of the present invention has the feature to fulfil the following conditions.

(1) $0.4f < f_{123} < f,\ f_{123} < 0$
(2) $3f < f_2 < 6f$
(3) $0.4f < r_8 < f$
(4) $20 < \nu_4 - \nu_5 < 30$
(5) $10f < r_9$
(6) $0.5f < r_{13} < f$

In the above, the reference symbol $f$ represents the focal length of the lens system as a whole, $f_{123}$ represents the total focal length of the first, second and third lenses, $f_2$ represents the focal length of the second lens, $r_8$ represents the radius of curvature of the cemented surface of the fourth lens, $\nu_4$ and $\nu_5$ represent Abbe's numbers of the cemented biconvex lens of the fourth lens, $r_9$ represents the radius of curvature of the lens surface on the image side of the cemented biconvex lens of the fourth lens, and $r_{13}$ represents the radius of curvature of the cemented surface of the cemented biconvex lens of the fifth lens.

3 Claims, 9 Drawing Figures

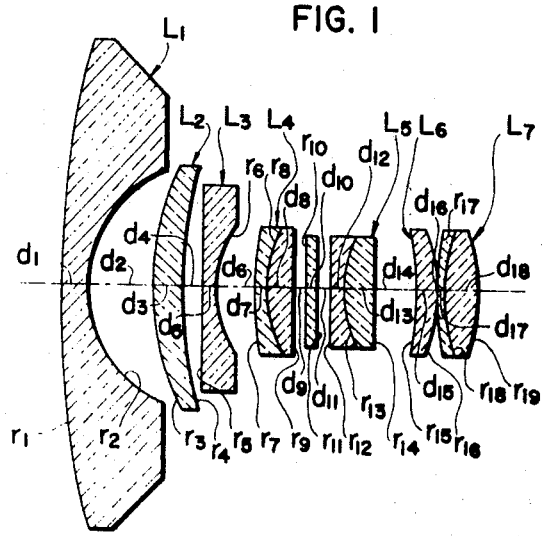
FIG. 1
FIG. 2A
SPHERICAL ABERRATION
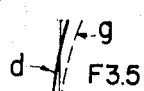
FIG. 2B
ASTIGMATISM
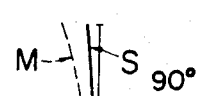
FIG. 2C
DISTORTION
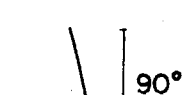
FIG. 2D
CHROMATIC ABERRATION OF MAGNIFICATION
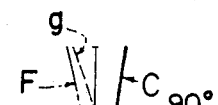

FIG. 3A
SPHERICAL ABERRATION
FIG. 3B
ASTIGMATISM
FIG. 3C
DISTORTION
FIG. 3D
CHROMATIC ABERRATION OF MAGNIFICATION
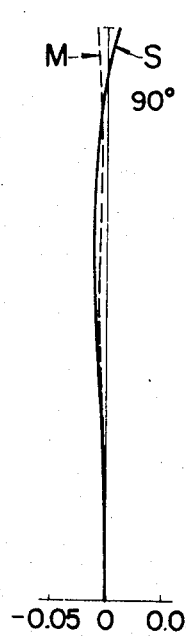
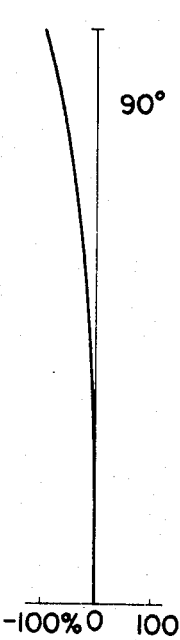
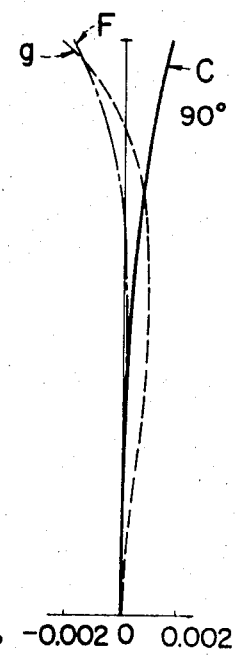

FISHEYE LENS SYSTEM

BACKGROUND OF THE INVENTION

The present invention relates to photographic lens systems and more particularly, to fisheye lens systems.

SUMMARY OF THE INVENTION

It is an object of the present invention to provide a fisheye lens system with a long back focal length, larger aperture ratio and with a large field angle of 180° which can be used for a Leica size (24 × 36 mm) camera.

Another object of the present invention is to provide a fisheye lens system for which the overall length is extremely short, the front lens is very small in diameter various aberrations are corrected favourably.

The fisheye lens system of the present invention comprises seven lenses from the first through seventh lenses, i.e., the first lens is a negative meniscus lens with its convex surface positioned on the object side, the second lens is a positive meniscus lens with its convex surface on the object side, the third lens is a negative lens, the fourth and fifth lenses are cemented biconvex lenses, the sixth lens is a positive meniscus lens with its convex surface on the image side and the seventh lens is a cemented biconvex lens. Besides, the fisheye lens system of the present invention satisfies the conditions as listed below when the reference symbol $f$ represents the focal length of the lens system as a whole, $f_{123}$ represents the total focal length of the first, second and third lenses, $f_2$ represents the focal length of the second lens, $r_8$ represents the radius of curvature of the cemented surface of the fourth lens, $\nu_4$ and $\nu_5$ respectively represents Abbe's numbers of the two lenses of the cemented fourth lens, $r_9$ represents the radius of curvature of the lens on the image side of the cemented fourth lens and $r_{13}$ represents the radius of curvature of the cemented surface of the fifth lens.

(1) $0.4f < |f_{123}| < f, f_{123} < 0$
(2) $3f < f_2 < 6f$
(3) $0.4f < r_8 < f$
(4) $20 < \nu_4 - \nu_5 < 30$
(5) $10f < |r_9|$
(6) $0.5f < r_{13} < f$

For the above-mentioned fisheye lens of the present invention, a negative meniscus lens with a strong power is adopted in order to secure a large field angle of 180° and to achieve a long back focal length. Besides, a positive meniscus lens with a comparatively weak power is adopted as the second lens. The fact to use a positive lens as the second as above is effective, because the incidence angle of the oblique ray to the second lens is large, for correction of aberrations for the intermediate field angle and for correction of the chromatic aberration of magnification which is an important problem especially regarding correction of aberrations for fisheye lens systems. Besides, a negative lens is used as the third lens to assist the power of the first lens, the fourth lens is composed with conditions similar to those of a hyperchromatic lens for the purpose of correcting the chromatic aberration and a cemented lens is used as the fifth lens so that its cemented surface serves for correction of aberrations. By providing a stop behind the fifth lens and composing the sixth and seventh lenses by a positive meniscus lens and positive cemented lens respectively, various aberrations are corrected favourably.

The following is to explain the reason why the lens system of the present invention is composed to satisfy the above-mentioned six conditions. First, as for the condition (1), offaxial aberrations cannot be corrected favourably if $|f_{123}|$ is smaller than $0.4f$. Besides, if $|f_{123}|$ is larger than $f$, the lens system cannot be composed compactly, the back focal length cannot be made long and, moreover, it becomes impossible to correct aberrations over a wide field angle. As for the condition (2), the fact to select the focal length $f_2$ in the range of $3f < f_2 < 6f$ is effective for correction of the coma, especially the coma for the intermediate field angle, and for correction of the chromatic aberration of magnification. If the condition (2) is not satisfied, the coma cannot be corrected satisfactorily. Conditions (3) and (4) are related with each other. If $r_8$ of the condition (3) is smaller than $0.4f$, the chromatic aberration of magnification is corrected excessively. If $r_8$ is larger than $f$, correction of said aberration becomes insufficient. If the condition (4), i.e., $20 < \nu_4 - \nu_5 < 30$, is not fulfilled, it is not desirable for correction of the chromatic aberration. In other words, it becomes very difficult to achieve favourable correction of the chromatic aberration even if the radius of curvature $r_8$ satisfies the condition (3). In case of $|r_9| < 10f$, the astigmatic difference becomes large. So, it is necessary to satisfy the condition (5), i.e., $10f < |r_9|$. The condition (6) is necessary for favourable correction of the spherical and chromatic aberrations. The correction of the spherical and chromatic aberrations will become excessive if $r_{13}$ is smaller than $0.5f$ and will become insufficient if $r_{13}$ is larger than $f$.

In the following, preferred embodiments of the present invention are described according to the accompanying drawings.

BRIEF DESCRIPTION OF THE DRAWING

FIG. 1 shows a sectional view illustrating the composition of the fisheye lens system of the present invention; and FIGS. 2A through 2D and 3A through 3D illustrate the curves showing the spherical aberration, astigmatism, distortion and chromatic aberration of magnification of the first and second embodiments of the present invention respectively.

DETAILED DESCRIPTION OF THE PREFERRED EMBODIMENTS

In the drawings, FIG. 1 shows the sectional view illustrating the schematic composition of the fisheye lens system of the present invention. The table below gives the concrete composition data of preferred embodiments of the present invention.

Table 1

| | | | | | | | | | |
|---|---|---|---|---|---|---|---|---|---|
| $r_1$ | = | 5.5184 | $d_1$ | = | 0.1237 | | | | |
| $r_2$ | = | 0.7370 | $d_2$ | = | 0.4157 | $n_1$ | = 1.58913 | $\nu_1$ | = 61.1 |
| $r_3$ | = | 1.6084 | $d_3$ | = | 0.1856 | | | | |
| $r_4$ | = | 3.4234 | $d_4$ | = | 0.0928 | $n_2$ | = 1.7859 | $\nu_2$ | = 44.2 |
| $r_5$ | = | −86.6068 | $d_5$ | = | 0.0742 | | | | |

Table 1 – Continued

| | | | | | | | | |
|---|---|---|---|---|---|---|---|---|
| $r_6$ | = | 0.6965 | $d_6$ | = | 0.2598 | $n_3$ | = | 1.58913 | $\nu_3$ | = | 61.1 |
| $r_7$ | = | 1.8556 | $d_7$ | = | 0.0619 | | | | | | |
| $r_8$ | = | 0.6771 | $d_8$ | = | 0.1534 | $n_4$ | = | 1.6968 | $\nu_4$ | = | 55.6 |
| $r_9$ | = | 46.7176 | $d_9$ | = | 0.0792 | $n_5$ | = | 1.69895 | $\nu_5$ | = | 30.1 |
| $r_{10}$ | = | ∞ | $d_{10}$ | = | 0.0742 | | | | | | |
| $r_{11}$ | = | ∞ | $d_{11}$ | = | 0.0829 | filter | | | | | |
| $r_{12}$ | = | 2.2085 | $d_{12}$ | = | 0.0749 | | | | | | |
| $r_{13}$ | = | 0.6517 | $d_{13}$ | = | 0.2017 | $n_6$ | = | 1.78472 | $\nu_6$ | = | 25.7 |
| $r_{14}$ | = | −6.6704 | $d_{14}$ | = | 0.2116 | $n_7$ | = | 1.60342 | $\nu_7$ | = | 38.0 |
| $r_{15}$ | = | −2.4646 | $d_{15}$ | = | 0.1237 | | | | | | |
| $r_{16}$ | = | −1.1253 | $d_{16}$ | = | 0.0062 | $n_8$ | = | 1.51728 | $\nu_8$ | = | 69.6 |
| $r_{17}$ | = | 4.9175 | $d_{17}$ | = | 0.0619 | | | | | | |
| $r_{18}$ | = | 1.3087 | $d_{18}$ | = | 0.1856 | $n_9$ | = | 1.80518 | $\nu_9$ | = | 25.4 |
| $r_{19}$ | = | −1.1190 | | | | $n_{10}$ | = | 1.51728 | $\nu_{10}$ | = | 69.6 |

$f = 1.0$     $f_2 = 3.694$     $f_B = 2.2916$     $f_{123} = -0.670$
F 1 : 3.5

Table 2

| | | | | | | | | |
|---|---|---|---|---|---|---|---|---|
| $r_1$ | = | 5.0022 | $d_1$ | = | 0.1251 | | | | | | |
| $r_2$ | = | 0.7760 | $d_2$ | = | 0.4030 | $n_1$ | = | 1.58913 | $\nu_1$ | = | 61.1 |
| $r_3$ | = | 1.4287 | $d_3$ | = | 0.1876 | | | | | | |
| $r_4$ | = | 2.3106 | $d_4$ | = | 0.0938 | $n_2$ | = | 1.7859 | $\nu_2$ | = | 44.2 |
| $r_5$ | = | 3.7526 | $d_5$ | = | 0.0750 | | | | | | |
| $r_6$ | = | 0.6617 | $d_6$ | = | 0.2257 | $n_3$ | = | 1.58913 | $\nu_3$ | = | 61.1 |
| $r_7$ | = | 1.6285 | $d_7$ | = | 0.0620 | | | | | | |
| $r_8$ | = | 0.4808 | $d_8$ | = | 0.1376 | $n_4$ | = | 1.6968 | $\nu_4$ | = | 55.6 |
| $r_9$ | = | 14.9131 | $d_9$ | = | 0.0867 | $n_5$ | = | 1.69895 | $\nu_5$ | = | 30.1 |
| $r_{10}$ | = | ∞ | $d_{10}$ | = | 0.0750 | | | | | | |
| $r_{11}$ | = | ∞ | $d_{11}$ | = | 0.0905 | filter | | | | | |
| $r_{12}$ | = | 5.0002 | $d_{12}$ | = | 0.0684 | | | | | | |
| $r_{13}$ | = | 0.5855 | $d_{13}$ | = | 0.2098 | $n_6$ | = | 1.78472 | $\nu_6$ | = | 25.7 |
| $r_{14}$ | = | −12.9796 | $d_{14}$ | = | 0.2672 | $n_7$ | = | 1.60342 | $\nu_7$ | = | 38.0 |
| $r_{15}$ | = | −3.7255 | $d_{15}$ | = | 0.1251 | | | | | | |
| $r_{16}$ | = | −1.2370 | $d_{16}$ | = | 0.0063 | $n_8$ | = | 1.51728 | $\nu_8$ | = | 69.6 |
| $r_{17}$ | = | 3.9866 | $d_{17}$ | = | 0.0625 | | | | | | |
| $r_{18}$ | = | 1.4291 | $d_{18}$ | = | 0.1876 | $n_9$ | = | 1.80518 | $\nu_9$ | = | 25.4 |
| $r_{19}$ | = | −0.9695 | | | | $n_{10}$ | = | 1.51728 | $\nu_{10}$ | = | 69.6 |

$f = 1.0$     $f_2 = 4.355$     $f_B = 2.3239$     $f_{123} = -0.761$
F 1 : 3.5

Regarding the above two embodiments of the present invention, the reference symbol $r_1$ through $r_{19}$ represent radii of curvature of respective surfaces of successive lenses, $d_1$ through $d_{18}$ represent thicknesses of successive lenses and distance between lenses on the axis, $n_1$ through $N_{10}$ represent refractive indexes of successive lenses, and $\nu_1$ through $\nu_{10}$ represent Abbe's numbers of successive lenses. The reference symbol $f$ designates the focal length of the lens system as a whole, $f_2$ designates the focal length of the second lens $L_2$, $f_{123}$ designates the total focal length of the first, second and third lenses, $f_B$ designates the back focal length and F designates the aperture ratio. In both of the above two embodiments, the filter is inserted between the fourth and fifth lenses. But, the filter may be of course placed at any other position.

FIGS. 2A through 2D shows the spherical aberration, astigmatism, distortion and chromatic aberration of magnification of the lens system of the first embodiment and FIGS. 3A through 3D shows the said aberrations for the lens system of the second embodiment. As it is evident from these figures, aberrations of the fisheye lens system of the present invention are corrected quite favourably.

I claim:

1. A fisheye lens comprising a first lens, a second lens, a third lens, a fourth doublet lens, a fifth doublet lens, a sixth lens and a seventh doublet lens wherein said first lens is a negative meniscus lens with its convex surface positioned on the object side, said second lens is a positive meniscus lens with its convex surface positioned on the object side, said third lens is a negative lens, said fourth doublet lens is a cemented biconvex lens, said fifth doublet lens is a cemented biconvex lens, said sixth lens is a positive meniscus lens with its convex surface positioned on the image side and said seventh doublet lens is a cemented biconvex lens; said lens system satisfying the following conditions:

(1) $0.67f < |f_{123}| < 0.77f$
(2) $3.6f < f_2 < 4.4f$
(3) $0.4f < r_8 < f$
(4) $20 < \nu_4 - \nu_5 < 30$
(5) $10f < |r_9|$
(6) $0.58f < r_{13} < 0.66f$ wherein the reference symbol $f$ represents the focal length of said lens system as a whole, $f_{123}$ represents the total focal length of said first, second and third lenses, $f_2$ represents the focal length of said second lens, $r_8$ represents the radius of curvature of the cemented surface of said fourth doublet lens, $\nu_4$ and $\nu_5$ represent Abbe's numbers of said cemented biconvex lens of said fourth doublet lens, $r_9$ represents the radius of curvature of the lens surface on the image side of said cemented biconvex lens of said fourth doublet lens and $r_{13}$ represents the radius of curvature of the cemented surface of said cemented biconvex lens of said fifth doublet lens.

2. A fisheye lens system comprising a first lens, a second lens, a third lens, a fourth doublet lens, a fifth doublet lens, a sixth lens and a seventh doublet lens wherein said first lens is a negative meniscus lens with its convex surface positioned on the object side, said second lens is a positive meniscus lens with its convex surface positioned on the object side, said third lens is a negative lens, said fourth doublet lens is a cemented biconvex lens, said fifth doublet lens is a cemented biconvex lens, said sixth lens is a positive meniscus lens with its convex surface positioned on the image side and said seventh doublet lens is a cemented biconvex lens; said lens system having the following numerical data:

| | | | | | | | | |
|---|---|---|---|---|---|---|---|---|
| $r_1$ | = | 5.5184 | $d_1$ | = | 0.1237 | | | |
| $r_2$ | = | 0.7370 | $d_2$ | = | 0.4157 | $n_1$ = 1.58913 | $\nu_1$ | = 61.1 |
| $r_3$ | = | 1.6084 | $d_3$ | = | 0.1856 | | | |
| $r_4$ | = | 3.4234 | $d_4$ | = | 0.0928 | $n_2$ = 1.7859 | $\nu_2$ | = 44.2 |
| $r_5$ | = | −86.6068 | $d_5$ | = | 0.0742 | | | |
| $r_6$ | = | 0.6965 | $d_6$ | = | 0.2598 | $n_3$ = 1.58913 | $\nu_3$ | = 61.1 |
| $r_7$ | = | 1.8556 | $d_7$ | = | 0.0619 | | | |
| $r_8$ | = | 0.6771 | $d_8$ | = | 0.1534 | $n_4$ = 1.6968 | $\nu_4$ | = 55.6 |
| $r_9$ | = | 46.7176 | $d_9$ | = | 0.0792 | $n_5$ = 1.69895 | $\nu_5$ | = 30.1 |
| $r_{10}$ | = | ∞ | $d_{10}$ | = | 0.0742 | | | |
| $r_{11}$ | = | ∞ | $d_{11}$ | = | 0.0829 | filter | | |
| $r_{12}$ | = | 2.2085 | $d_{12}$ | = | 0.0749 | | | |
| $r_{13}$ | = | 0.6517 | $d_{13}$ | = | 0.2017 | $n_6$ = 1.78472 | $\nu_6$ | = 25.7 |
| $r_{14}$ | = | −6.6704 | $d_{14}$ | = | 0.2116 | $n_7$ = 1.60342 | $\nu_7$ | = 38.0 |
| $r_{15}$ | = | −2.4646 | $d_{15}$ | = | 0.1237 | | | |
| $r_{16}$ | = | −1.1253 | $d_{16}$ | = | 0.0062 | $n_8$ = 1.51728 | $\nu_8$ | = 69.6 |
| $r_{17}$ | = | 4.9175 | $d_{17}$ | = | 0.0619 | | | |
| $r_{18}$ | = | 1.3087 | $d_{18}$ | = | 0.1856 | $n_9$ = 1.80518 | $\nu_9$ | = 25.4 |
| $r_{19}$ | = | −1.1190 | | | | $n_{10}$ = 1.51728 | $\nu_{10}$ | = 69.6 |

$f = 1.0$   $f_2 = 3.694$   $f_B = 2.2916$   $f_{123} = -0.670$
F 1 : 3.5 wherein the reference symbol $r_1$ through $r_{19}$ represent radii of curvature of respective surfaces of successive lenses, $d_1$ through $d_{18}$ represent thicknesses of successive lenses and distance between lenses on the axis, $n_1$ through $n_{10}$ represent refractive indexes of successive lenses, and $\nu_1$ through $\nu_{10}$ represent Abbe's numbers of successive lenses, the reference symbol $f$ designates the focal length of the lens system as a whole, $f_2$ designates the focal length of the second lens $L_2$, $f_{123}$ designates the total focal length of the first, second and third lenses, $f_B$ designates the back focal length and F designates the aperture ratio.

3. A fisheye lens system comprising a first lens, a second lens, a third lens, a fourth doublet lens, a fifth doublet lens, a sixth lens and a seventh doublet lens wherein said first lens is a negative meniscus lens with its convex surface positioned on the object side, said second lens is a positive meniscus lens with its convex surface positioned on the object side, said third lens is a negative lens, said fourth doublet lens is a cemented biconvex lens, said fifth doublet lens is a cemented biconvex lens, said sixth lens is a positive meniscus lens with its convex surface positioned on the image side and said seventh doublet lens is a cemented biconvex lens; said lens system having the following numerical data:

| | | | | | | | | |
|---|---|---|---|---|---|---|---|---|
| $r_1$ | = | 5.0022 | $d_1$ | = | 0.1251 | | | |
| $r_2$ | = | 0.7760 | $d_2$ | = | 0.4030 | $n_1$ = 1.58913 | $\nu_1$ | = 61.1 |
| $r_3$ | = | 1.4287 | $d_3$ | = | 0.1876 | | | |
| $r_4$ | = | 2.3106 | $d_4$ | = | 0.0938 | $n_2$ = 1.7859 | $\nu_2$ | = 44.2 |
| $r_5$ | = | 3.7526 | $d_5$ | = | 0.0750 | | | |
| $r_6$ | = | 0.6617 | $d_6$ | = | 0.2257 | $n_3$ = 1.58913 | $\nu_3$ | = 61.1 |
| $r_7$ | = | 1.6285 | $d_7$ | = | 0.0620 | | | |
| $r_8$ | = | 0.4808 | $d_8$ | = | 0.1376 | $n_4$ = 1.6968 | $\nu_4$ | = 55.6 |
| $r_9$ | = | 14.9131 | $d_9$ | = | 0.0867 | $n_5$ = 1.69895 | $\nu_5$ | = 30.1 |
| $r_{10}$ | = | ∞ | $d_{10}$ | = | 0.0750 | | | |
| $r_{11}$ | = | ∞ | $d_{11}$ | = | 0.0905 | filter | | |
| $r_{12}$ | = | 5.0002 | $d_{12}$ | = | 0.0684 | | | |
| $r_{13}$ | = | 0.5855 | $d_{13}$ | = | 0.2098 | $n_6$ = 1.78472 | $\nu_6$ | = 25.7 |
| $r_{14}$ | = | −12.9796 | $d_{14}$ | = | 0.2672 | $n_7$ = 1.60342 | $\nu_7$ | = 38.0 |
| $r_{15}$ | = | −3.7255 | $d_{15}$ | = | 0.1251 | | | |
| $r_{16}$ | = | −1.2370 | $d_{16}$ | = | 0.0063 | $n_8$ = 1.51728 | $\nu_8$ | = 69.6 |
| $r_{17}$ | = | 3.9866 | $d_{17}$ | = | 0.0625 | | | |
| $r_{18}$ | = | 1.4291 | $d_{18}$ | = | 0.1876 | $n_9$ = 1.80518 | $\nu_9$ | = 25.4 |
| $r_{19}$ | = | −0.9696 | | | | $n_{10}$ = 1.51728 | $\nu_{10}$ | = 69.6 |

$f = 1.0$   $f_2 = 4.355$   $f_B = 2.3239$   $f_{123} = -0.761$
F 1 : 3.5 wherein the reference symbol $r_1$ through $r_{19}$ represent radii of curvature of respective surfaces of successive lenses, $d_1$ through $d_{18}$ represent thicknesses of successive lenses and distance between lenses on the axis, $n_1$ through $n_{10}$ represent refractive indexes of successive lenses, and $\nu_1$ through $\nu_{10}$ represent Abbe's numbers of successive lenses, the reference symbol $f$ designates the focal length of the lens system as a whole, $f_2$ designates the focal length of the second lens $L_2$, $f_{123}$ designates the total focal length of the first, second and third lenses, $f_B$ designates the back focal length and F designates the aperture ratio.

* * * * *